March 10, 1970 D. L. MENSA 3,500,257

PASSIVE R-C INTEGRATOR WITH ESSENTIALLY LINEAR OUTPUT

Filed March 20, 1967 2 Sheets-Sheet 1

PRIOR ART

INVENTOR.
DEAN L. MENSA
BY [signature] AGENT
[signature]
ATTORNEY

United States Patent Office 3,500,257 Patented Mar. 10, 1970

3,500,257 PASSIVE R-C INTEGRATOR WITH ESSENTIALLY LINEAR OUTPUT

Dean L. Mensa, 954 Ann Arbor Ave., Ventura, Calif. 93003

Filed Mar. 20, 1967, Ser. No. 624,619
Int. Cl. H03r *6/04*
U.S. Cl. 333—19 1 Claim

ABSTRACT OF THE DISCLOSURE

An electrical circuit for improving the linearity of response of a standard R-C network to an applied step function or square wave. By adding a potentiometer and a capacitor connected "in cascade" across the output of a conventional integrator, a signal can be obtained from the movable arm of the potentiometer which more closely approximates a linear function, especially at low output amplitudes.

The invention described herein may be manufactured and used by or for the Government of the United States of America for governmental purposes without the payment of any royalties thereon or therefor.

BACKGROUND OF THE INVENTION

The invention lies in the field of electrical integrating networks. Many wave-shaping applications which require linear sweep functions now utilize passive circuits to integrate a D-C voltage or applied square wave. These circuits, usually consisting of an R-C combination, are attractive to a circuit designer because of their inherent simplicity.

The linearity requirements imposed on the developed ramp or triangular wave, however, often necessitate large circuit time constants, with attendant large attenuation and occasionally impractical values of capacitance. Furthermore, the step response of a conventional R-C network is an exponential function, a poor approximation to a linear function, and is further degraded as increasing values of time and amplitude are considered. It is this "trade-off" between amplitude and linearity that has, in the past, compelled the circuit designer to resort to an active approach to the development of linear sweeps in spite of the resulting increase in network complexity.

SUMMARY OF THE INVENTION

The present invention is concerned with the production of an essentially linear ramp or triangular wave from an applied step function by means of entirely passive circuit elements—an R-C network, for example. An adjustable resistor or potentiometer is connected in series with a capacitor, and this combination is placed "in cascade" across the output of a standard R-C integrator. The signal derived from the potentiometer arm will be a much closer approximation to a linear function than is the output of the standard R-C arrangement alone.

An object of the present invention, therefore, is to provide a passive electrical integrating network capable of yielding an essentially linear output variation.

Another object of the invention is to improve the linearity of response of a standard R-C network to an applied step function by adding to such network a further capacitor and a potentiometer the setting of which is determinative of step response linearity.

Other objects, advantages, and novel features of the invention will become apparent from the following detailed description of the invention when considered in conjunction with the accompanying drawings wherein:

DESCRIPTION OF THE PREFERRED EMBODIMENT

Figure 1:
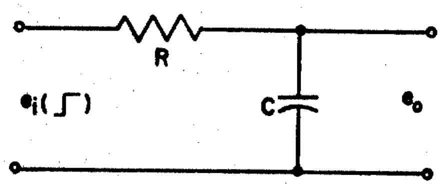
FIG. 1 of the drawings is a schematic representation of a conventional R-C integrating network as now known in the art.
Figure 1A:
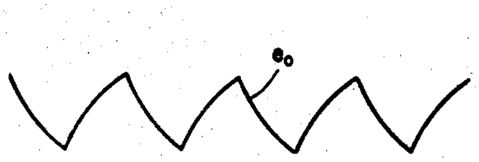
FIG. 1*a* is a waveform of an output voltage such as might be obtained from the network of FIG. 1.
Figure 5A:
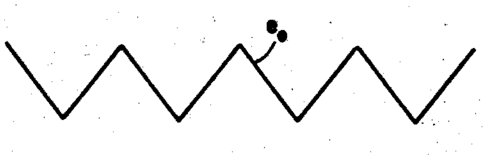
FIG. 5*a* is a waveform of an output voltage such as might be obtained from the network of FIG. 5.
Figure 2:
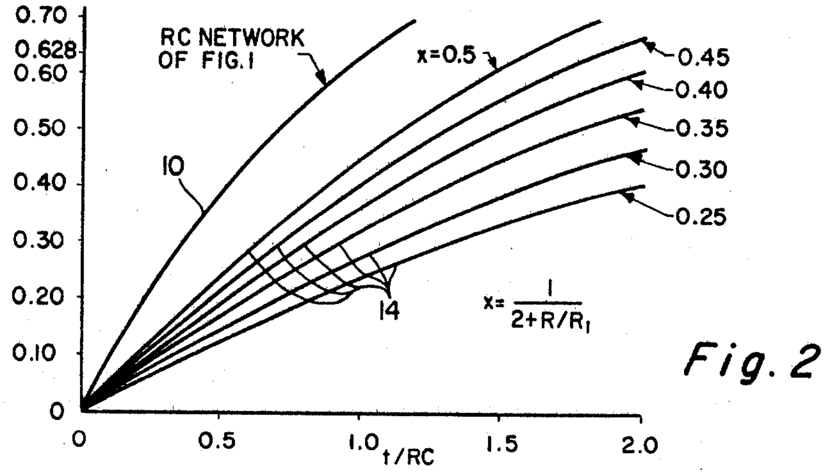
FIGS. 2 and 3 are graphs illustrating certain electrical properties of the network of FIG. 1 and how they are modified by the addition of the invention concept.
Figure 3:
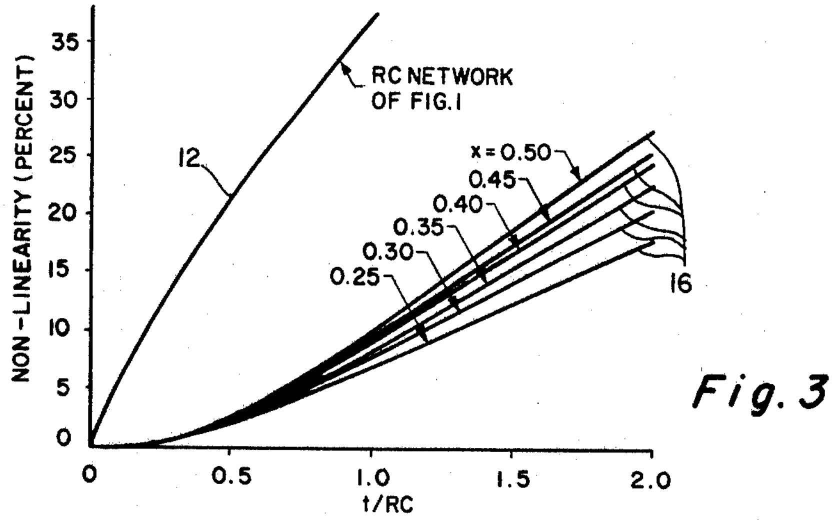

The step response of the conventional R-C network of FIG. 1 is designated by the reference numeral 10 in FIG. 2 of the drawings. This curve illustrates that the exponential function's approximation to a linear function improves as decreasing values of time (and amplitude) are considered. A plot of the linearity of the response (defined as the difference between the linear and exponential functions divided by the value of the linear function) is shown in FIG. 3 and identified by the reference numeral 12. The ordinate in this graph is labeled "percent non-linearity," however, since increasing values indicate a greater departure from the linear function. FIG. 1*a* depicts a representative output waveform $e_o$ such as might be obtained in response to the application to the network of FIG. 1 of a step function $e_i$, the degree of ramp non-linearity being appreciable.

In approaching the design of a circuit of the passive type that will possess a step response more nearly approaching linearity than the single-section R-C network of FIG. 1, it is helpful to consider a Taylor series expansion of the desired function about the origin:

(1)

$$f(t)=Kt=f(t_0)+f'(t_0)t+\frac{f''(t_0)t^2}{2!}+\ .\ .\ .\ +\frac{f^{(n)}(t_0)t^n}{n!}$$

The above series is an approximation to the required function. Equating coefficients of like powers yields:

(2) (*a*) $f(t_o)=O$
(*b*) $f'(t_o)=K$
(*c*) $f''(t_o)=O$

* * * * *

(*n*) $f^{(n)}(t_o)=O$

Equation 2 represents the conditions necessary (and sufficient) to generate the required function. The approximation of Equation 1 is improved as more of the conditions of Equation 2 are met.

Now, the unit step response of the single-section R-C network of FIG. 1 is:

(3) $e(t)=1-e^{-t/RC}$

Successive differentiation brings out that only ($a$) and ($b$) of Equation 2 can be satisfied; the initial value of the second (and successive) derivative cannot be forced to zero. This factor illustrates the shortcomings of the single-section R-C network of FIG. 1 as a linear function generator. A network with step response equal to the initial second derivative of zero will provide the next better order of approximation to the ramp.

Figure 4:
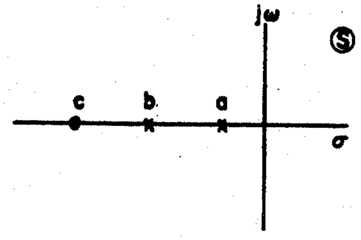
FIG. 4 is a graph forming the basis for a mathematical analysis of the operation of a circuit such as that with which the present invention is concerned.

One solution to the above problem is based upon the transfer function's zero-pole configuration illustrated in FIG. 4 of the drawings. From this configuration the following equation may be derived:

$$T(s)=\frac{E_o}{E_{in}}=\frac{K(s+c)}{(s+a)(s+b)} \qquad (4)$$

The network's step response, and its first and second derivatives are:

$$e(t)=1+\frac{(a-c)}{(b-a)}e^{a-t}-\frac{(b-c)}{b(b-a)}e^{-tb} \qquad (5)$$

$$e'(t)=\frac{(c-a)}{(b-a)}e^{-at}-\frac{(c-b)}{(b-a)}e^{-bt} \qquad (6)$$

$$e''(t)=\frac{a(a-c)}{(b-a)}e^{-at}-\frac{b(b-c)}{(b-a)}e^{-bt} \qquad (7)$$

The initial values of these functions, evaluated by setting $t=0$ are:

(8) $e(t_o)=O$ for all values of $a$, $b$, $c$ (9) $e'(t_o)=K$ for all values of $a$, $b$, $c$

(10) $e''(t_o)=C-(a+b)$

If Equation 10 is set to zero, yielding $C=a+b$, the initial values of the function match Equations 2($a$), 2($b$) and 2($c$), respectively. This indicates that a network transfer function with a zero value equal to the sum of the pole values will provide a better approximation to the required function than does the single-section network of FIG. 1. A circuit exhibiting the required transfer function is illustrated in FIG. 5 of the drawings, a potentiometer $R_1$ and a second capacitor $C_1$ being added "effectively in cascade" across the output of the R-C combination of FIG. 1.

Figure 5:
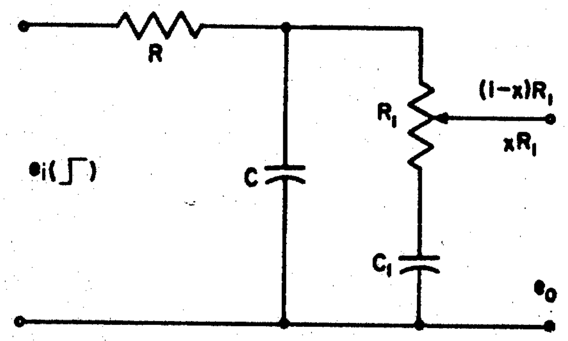
FIG. 5 is a schematic representation of an R-C integrating network designed in accordance with a preferred embodiment of the present invention.

The transfer function of the network of FIG. 5

$$T(s)=\frac{E_o}{E_i}=\frac{R_1C_1x}{RCR_1C_1}\cdot\frac{S+\frac{1}{R_1C_1x}}{S^2+s\frac{RC+R_1C_1+RC_1}{RCR_1C_1}+RCR_1C_1} \qquad (11)$$

shows that $x$, the setting of potentiometer $R_1$, provides a control of the zero position independent of the pole positions, thus facilitating the required zero-pole configuration.

Equating expressions 4 and 11 demonstrate the values of the zeros and poles in terms of the circuit elements:

$$T(s)=\frac{E_o}{E_i}=\frac{K(S+C)}{S^2+(a+b)S+ab}=$$

$$\frac{R_1C_1x}{RCR_1C_1}\cdot\frac{S+\frac{1}{R_1C_1x}}{S^2+S\frac{RC+R_1C_1+RC}{RCR_1C_1}+\frac{1}{RCR_1C_1}} \qquad (12)$$

Setting $RC=R_1C_1$ provides a useful simplification that does not detract from the generality of the treatment. Now, substituting the conduits $C=a+b$ and $RC=R_1C_1$ in Equation 12 yields $$X=\frac{1}{RC}\frac{1}{(a+b)}=\frac{1}{2+R/R_1} \qquad (13)$$

and insures that the initial value for the second derivative of the step response is zero, thus satisfying the stated requirement.

The transfer function of the network of FIG. 5 (Equation 11) may be rewritten as:

$$T(s)=\frac{E_o}{E_i}=\frac{x}{RC}\cdot\frac{S+\frac{1}{xR_1C_1}}{S^2+S\left(\frac{1}{R_1C_1}+\frac{1}{RC}+\frac{1}{R_1C}\right)+\frac{1}{RCR_1C_1}}$$

The unit step response (Equation 5) may also be rewritten as $$e_o(t)=1-\frac{b^2}{b^2-a^2}e^{-at}+\frac{a^2}{b^2-a^2}e^{-bt}$$

where $$a=\frac{1}{RC}\left[\frac{2+\frac{R}{R_1}}{2}-\frac{R}{2R_1}\sqrt{\frac{4R_1}{R}+1}\right]$$

$$b=\frac{1}{RC}\left[\frac{2+\frac{R}{R_1}}{2}+\frac{R}{2R_1}\sqrt{\frac{4R_1}{R}+1}\right]$$

In FIG. 2 of the drawings is brought out how the step response of the conventional R-C network of FIG. 1 is improved by use of the arrangement of FIG. 5. The curves 14 are for various settings $x$ of potentiometer $R_1$, $x$ being equal to $$\frac{1}{2+\frac{R}{R_1}}$$

FIG. 3 compares step response linearity vs. time for various values of $x$. The curves 14 (FIG. 2) and 16 may be employed as design charts to determine the time constant RC, the potentiometer setting $x$, and the corresponding ratio $R/R_1$ for required amplitudes and linearities. It should be noted that $x=0.5$ is the maximum value, since it requires $R/R_1=0$. Any one circuit element value may be arbitrarily chosen to satisfy impedance levels or available capacitor values.

Figure 6:
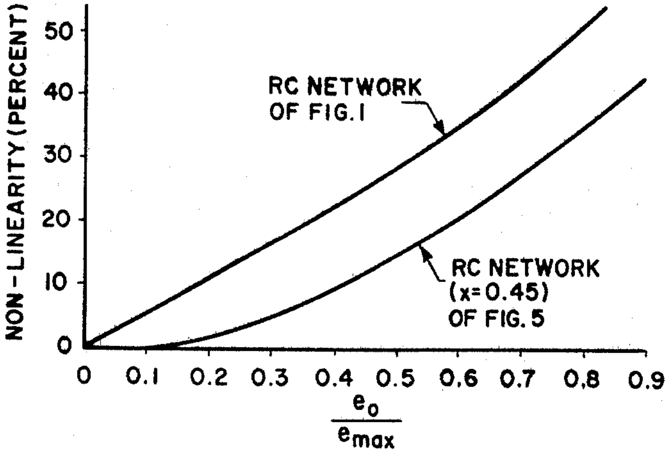
FIG. 6 is a graph comparing the respective networks of FIGS. 1 and 5 as to one of their response characteristics.

FIG. 6 illustrates a linearity vs. output amplitude comparison for the respective networks of FIGS. 1 and 5 for $x=0.45$. It will be apparent that the latter circuit provides greater linearity for a given output level. This improvement in linearity yielded by the invention arrangement (as exemplified by the waveform $e_o$ of FIG. 5$a$) may, in many cases, obviate the necessity for utilizing active sweep circuits and permit the retention of passive designs with their inherent simplicity and high reliability.

Obviously many modifications and variations of the present invention are possible in the light of the above teachings. It is therefore to be understood that within the scope of the appended claim the invention may be practiced otherwise than as specifically described.

What is claimed is:

1. In an electrical integrating circuit of the passive type in which an input signal of substantially rectangular waveform passes through a wave-shaping unit consisting of a series resistor R and a shunt capacitor C, the action of such wave-shaping unit being to modify the configuration of such input signal into an output variation of essentially triangular shape but with a non-linear ramp portion, the improvement which comprises:

means for causing the ramp portion of said output signal to more closely approach linearity, said means comprising:

a second wave-shaping unit consisting of a second resistor $R_1$ in the form of a potentiometer and a second capacitor $C_1$, said second wave-shaping unit receiving the output of said first wave-shaping unit and developing an output at the arm of said potentiometer, the transfer function T(*s*) of the circuit consisting of both said wave-shaping units being expressed as $$\frac{R_1C_1x}{RCR_1C_1} \cdot \frac{S+\frac{1}{R_1C_1x}}{S^2+S\frac{RC+R_1C_1+RC_1}{RCR_1C_1}+\frac{1}{RCR_1C_1}}$$

where $x$ is the setting of potentiometer $R_1$, such that $$x=\frac{1}{2+R/R_1}$$

and $RC=R_1C_1$.

References Cited

UNITED STATES PATENTS 2,609,507 9/1952 Schlesinger ------ 331—153 XR

ELI LIEBERMAN, Primary Examiner

MARVIN NUSSBAUM, Assistant Examiner

U.S. Cl. X.R.

333—20